United States Patent [19]

Morey

[11] Patent Number: 5,148,667
[45] Date of Patent: Sep. 22, 1992

[54] GAS TURBINE FLAME DIAGNOSTIC MONITOR

[75] Inventor: William W. Morey, West Hartford, Conn.

[73] Assignee: Electric Power Research Institute, Palo Alto, Calif.

[21] Appl. No.: 473,573

[22] Filed: Feb. 1, 1990

[51] Int. Cl.⁵ .............................................. F02C 7/00
[52] U.S. Cl. ............................... 60/39.02; 60/39.091; 60/39.33; 431/13
[58] Field of Search ............. 60/39.02, 39.091, 39.141, 60/39.24, 39.33, 39.281; 431/13, 14

[56] References Cited

U.S. PATENT DOCUMENTS

| 3,504,490 | 4/1970 | Klamm | 60/39.091 |
|---|---|---|---|
| 4,041,694 | 8/1977 | Lewis | 60/39.02 |
| 4,414,804 | 11/1983 | Menard et al. | 60/39.141 |
| 4,644,173 | 2/1987 | Jeffers | 250/554 |

FOREIGN PATENT DOCUMENTS

| 159423 | 6/1989 | Japan | 60/39.091 |
|---|---|---|---|
| 64232 | 3/1990 | Japan | 60/39.33 |

*Primary Examiner*—Louis J. Casaregola
*Attorney, Agent, or Firm*—Leonard Bloom

[57] ABSTRACT

A gas turbine flame diagnostic monitor has been described incorporating a plurality of viewing probes to be positioned in a plurality of combustors of a gas turbine and coupled to a plurality of optical fiber image guides for transferring the image from each viewing probe to a video camera. The video camera is coupled to a monitor for displaying the flame received by each combustor probe. A video analyzer generates flame intensity patterns, centroids and second order moments and compares them with predetermined stored flame intensity patterns, centroids and second order moments, and logic for providing diagnostic interpretations of the operation of the gas turbine which is coupled to a turbine controller for controlling the gas turbine to provide balanced combustor operation for optimum temperature of the exhaust gases at the first blade row and to warn station operators of impending problems and shut down the turbine at times when turbine malfunctions are observed. The flame diagnostic monitor overcomes the problem of diagnosing faults in the combustors of gas turbines, and also helps prevent subsequent duct explosions during start up when ignition does not occur in a combustor.

3 Claims, 4 Drawing Sheets

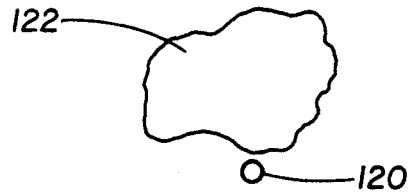
FIG.3       FIG.4
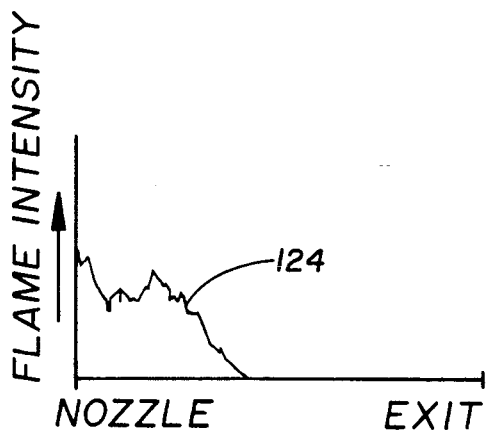
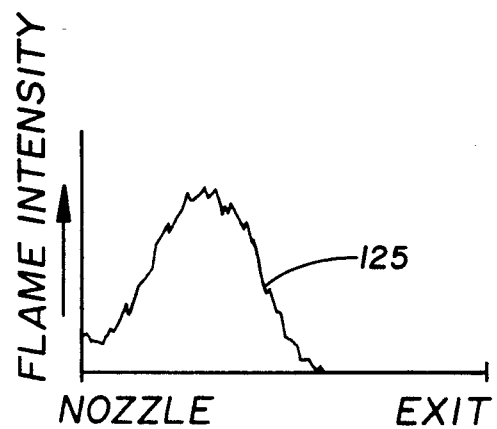
FIG.5       FIG.6
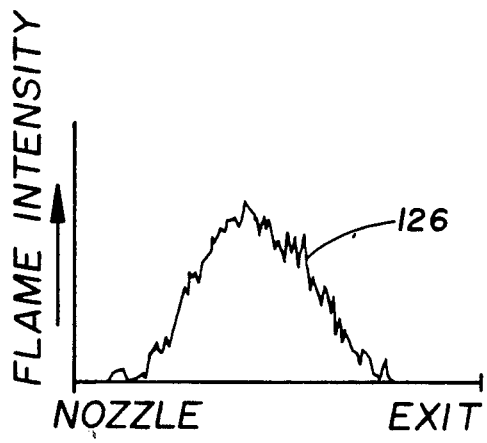
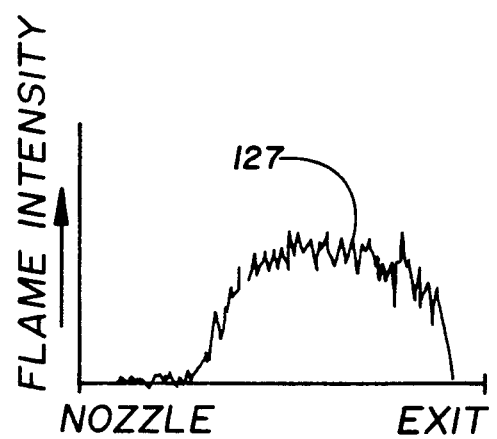
FIG.7       FIG.8

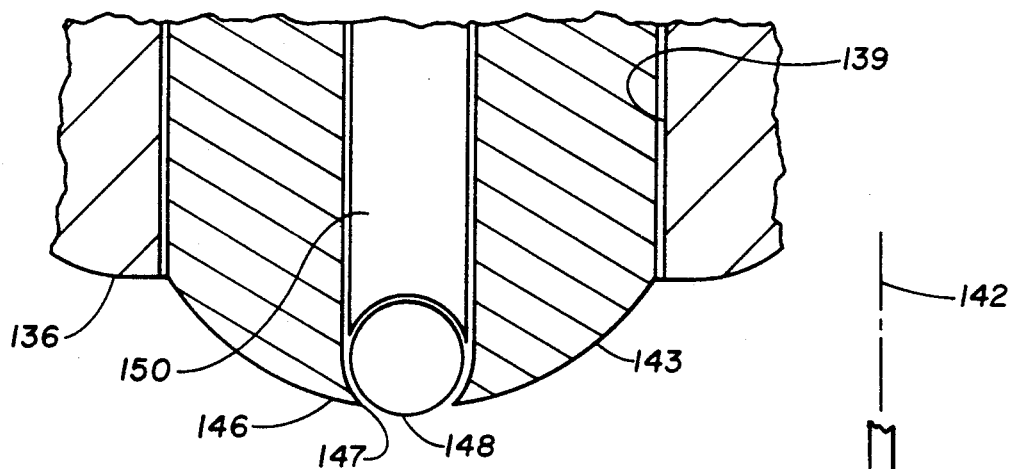
FIG. 11
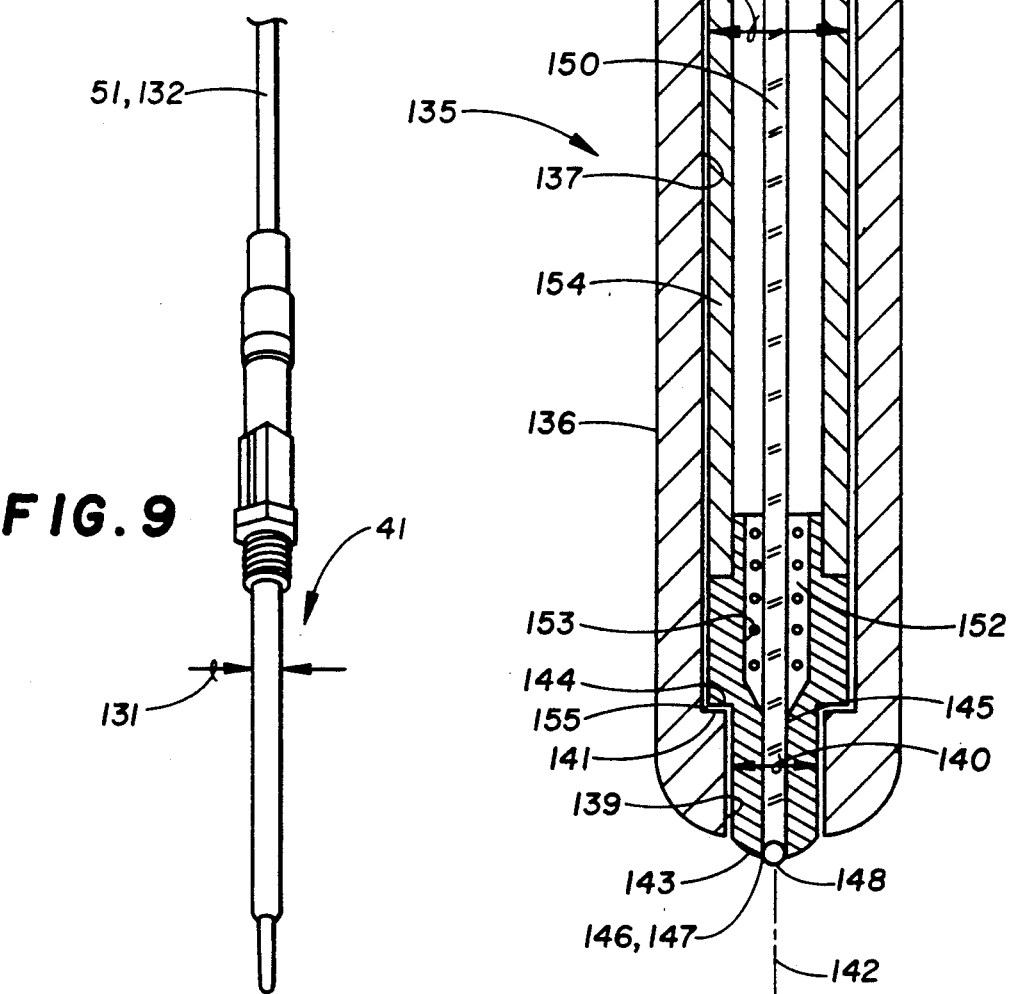
FIG. 9
FIG. 10

GAS TURBINE FLAME DIAGNOSTIC MONITOR

BACKGROUND OF THE INVENTION

1. Field of the Invention

This invention relates to gas turbines and more particularly to a flame monitor for scanning the combustion flame in one or more combustors to diagnose and control the operation of the gas turbine.

2. Description of the Prior Art

Gas turbines are used by electric utilities to drive generators to generate electricity. A gas turbine includes a number of combustors which are stationary and turbine blades which rotate on a rotor. The turbine blades are driven by the exhaust gases from the combustors. The combustors are fed with a fuel such as natural gas, or oil by fuel nozzles at one end of the combustors which ignite in the combustor forming a flame which has a recognizable pattern or signature. An air supply is also provided to the combustor to provide oxygen for combustion.

In the prior art it has been known to insert a viewing probe into the combustor to view the flame over angles from the outlet of the fuel nozzle to the exit of the combustor. A description of a viewing probe for monitoring a single combustor is described in U.S. Pat. No. 4,711,524 which issued on Dec. 8, 1987 by W. W. Morey et al. entitled "Combustor Fiberscope" and in a publication by A. C. Dolbec et al., entitled "Advanced Diagnostic Instrumentation For Combustion Turbines" proceedings of the American Power Conference, American Power Conference, Apr. 15, 1986, pages 1–7. A further description is provided in a paper by W. W. Morey and L. C. Angello entitled "Diagnostics from Imaging Inside Gas Turbine Combustors" presented at the International Society for Optical Engineering Meeting held at Quebec, Canada Jun. 4–6, 1986 and published in the Proceedings of SPIE "Optical Techniques for Industrial Inspection," Vol. 665, pp. 306–313. Further, an R&D status report was provided by L. C. Angello and G. H. Quentin, entitled "Gas Turbine Diagnostic Instrumentation", E.P.R.I. Journal, April/May 1986 pages 34–36 wherein an experimental monitoring system was installed in the hot gas path of a turbine was reported. The combustion viewing system used a video link to provide visual information on the flame in the combustor. An optical probe had a lens assembly with a wide angle (120°–140°) field of view to cover the extent of the combustor flame over a 356 millimeter (14 inch) combustor section. A subsequent R&D status report was given by L. C. Angello and G. H. Quentin entitled "Diagnostic Instrumentation for Combustion", E.P.R.I. Journal, July/August 1987 pages 38–40 wherein it was reported that the viewing probe demonstrated its usefulness in locating the combustor flame, determining its size, extension, and orientation; indicating light-off (ignition), flame-out, full-speed, no-load, and on-load conditions; and determining the presence of water injection, cross-fire flow, and intermittent water injection. Typical examples of combustor flame images with the fiber-optic viewing probe were also shown for a turbine during ignition, full-speed no-load condition, full-load condition and when water is injected for $NO_x$ control.

In U.S. Pat. No. 4,711,524 mentioned above a viewing lens is described comprising a sapphire doublet which is held internally in the probe with a viewing port at an opening in the end of the probe along the optical axis of the viewing lens.

SUMMARY OF THE INVENTION

In accordance with the present invention, an apparatus and method for using a flame diagnostic monitor in a gas turbine is described comprising the steps of scanning at least one combustion chamber to determine the extent of electromagnetic radiation (sensed at a photodetector) with respect to a fuel nozzle supplying fuel therein, determining the distance from the fuel nozzle to the onset of flame, determining the electromagnetic radiation from the flame as a function of distance from the nozzle, and estimating the torque load on the gas turbine as a function of the distance from the fuel nozzle for the onset of flame and the electromagnetic radiation as a function distance from the fuel nozzle.

The invention further provides an apparatus and method for preventing a duct explosion in the exhaust path downstream from a gas turbine combustor comprising the steps of optically monitoring each combustor in a predetermined area, generating signals indicative of the a flame pattern based on electromagnetic radiation from a flame in each combustor, and decreasing the fuel supply to each combustor after a predetermined time period in response to said signals when said signals indicate an insufficient flame pattern during said time period.

The invention further provides an apparatus and method for controlling the temperature of the exhaust gases from a combustor comprising the steps of optically monitoring the flame in a predetermined area within said combustor, determining the electromagnetic radiation from the flame within said predetermined area, and adjusting the fuel supply rate to the combustor in response to the electromagnetic radiation and location of said flame.

The invention further provides an apparatus and method for controlling a gas turbine having a plurality of combustors and a plurality of turbine blade rows attached to a rotating rotor comprising an optical viewing probe positioned in each combustor to view the flame in a predetermined portion of said combustor, means for determining a flame pattern based on electromagnetic radiation as a function of the field of view in each combustor, means for comparing said determined flame flame patterns from each combustor with respect to predetermined flame intensity patterns, and means for controlling the fuel supply rate to one or more combustors in response to said means for comparing.

The invention further provides an apparatus and method for detecting the malfunction of a gas turbine operating under torque load comprising the steps of optically viewing the flame in each combustor of said gas turbine, determining a flame pattern based on the electromagnetic radiation from the flame as a function of position in the field of view in each combustor and comparing the flame patterns of each combustor with a predetermined plurality of flame patterns, and determining a diagnosis of malfunction associated with one or more combustors of said turbine by the individual and total combustor correlation with the predetermined flame patterns.

The invention further provides an optical viewing probe for monitoring the flame in a combustor of a gas turbine. The probe includes a spring loaded sapphire ball lens coupled to an image transmitting fiber optic without the need for cooling liquids such as water and air or of air for purging the immediate environment of the optical probe.

BRIEF DESCRIPTION OF THE DRAWINGS

FIG. 3 is a view of fuel ignition in an adjacent combustor viewed through a cross fire tube.

FIG. 4 is a view of fuel ignition in a combustor being monitored.

FIGS. 5–8 are graphs of flame intensity with different turbine loadings.

FIG. 9 is a view of the flame monitor probe.

FIG. 10 is an enlarged view of the distal end of the flame monitor probe.

FIG. 11 is an enlarged view of a portion of FIG. 10.

DESCRIPTION OF THE PREFERRED EMBODIMENTS

Figure 1:
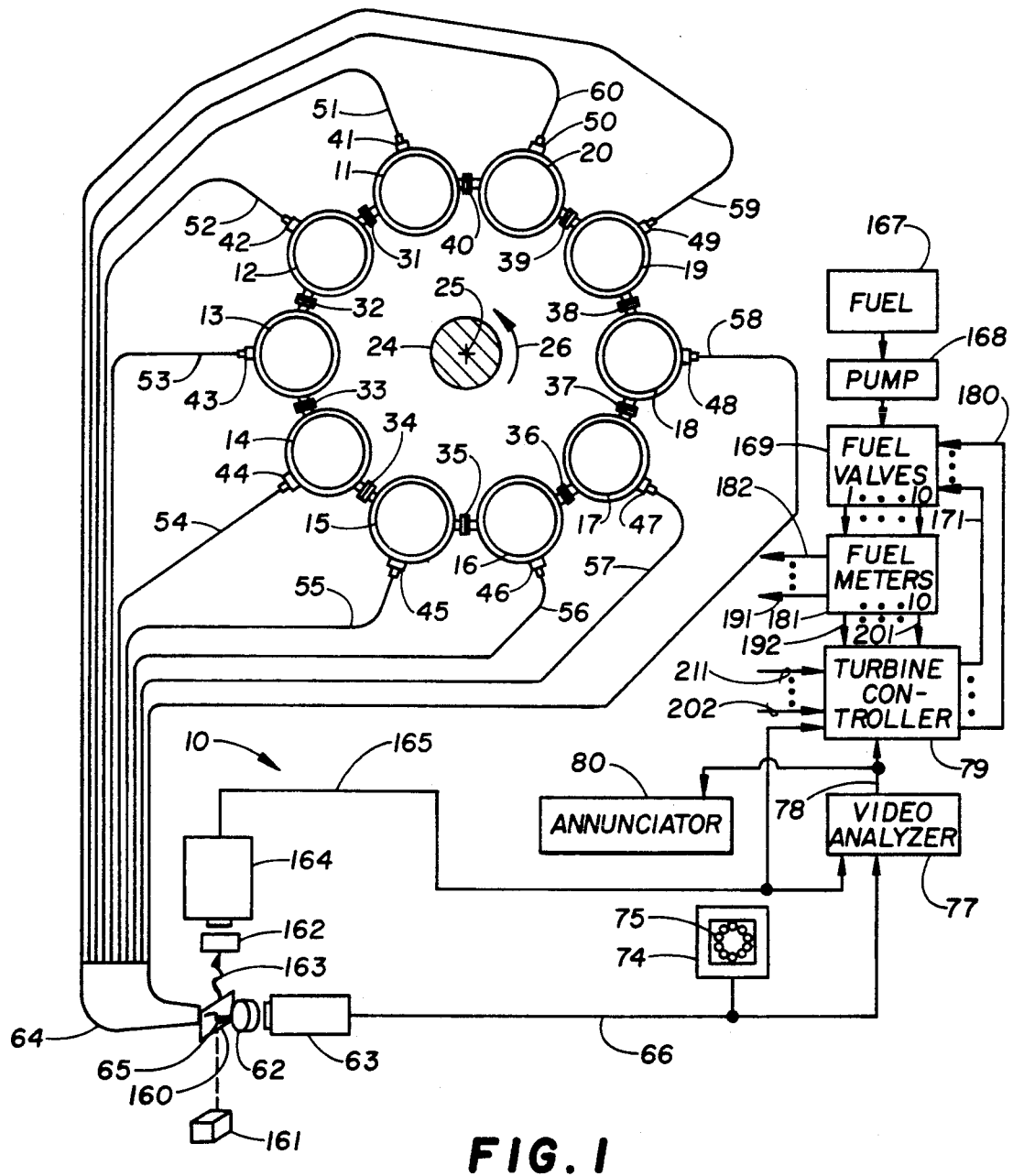
FIG. 1 is a cross sectional diagram of a plurality of combustors positioned upstream of a gas turbine and a block diagram of a flame diagnostic monitor.
Figure 2:
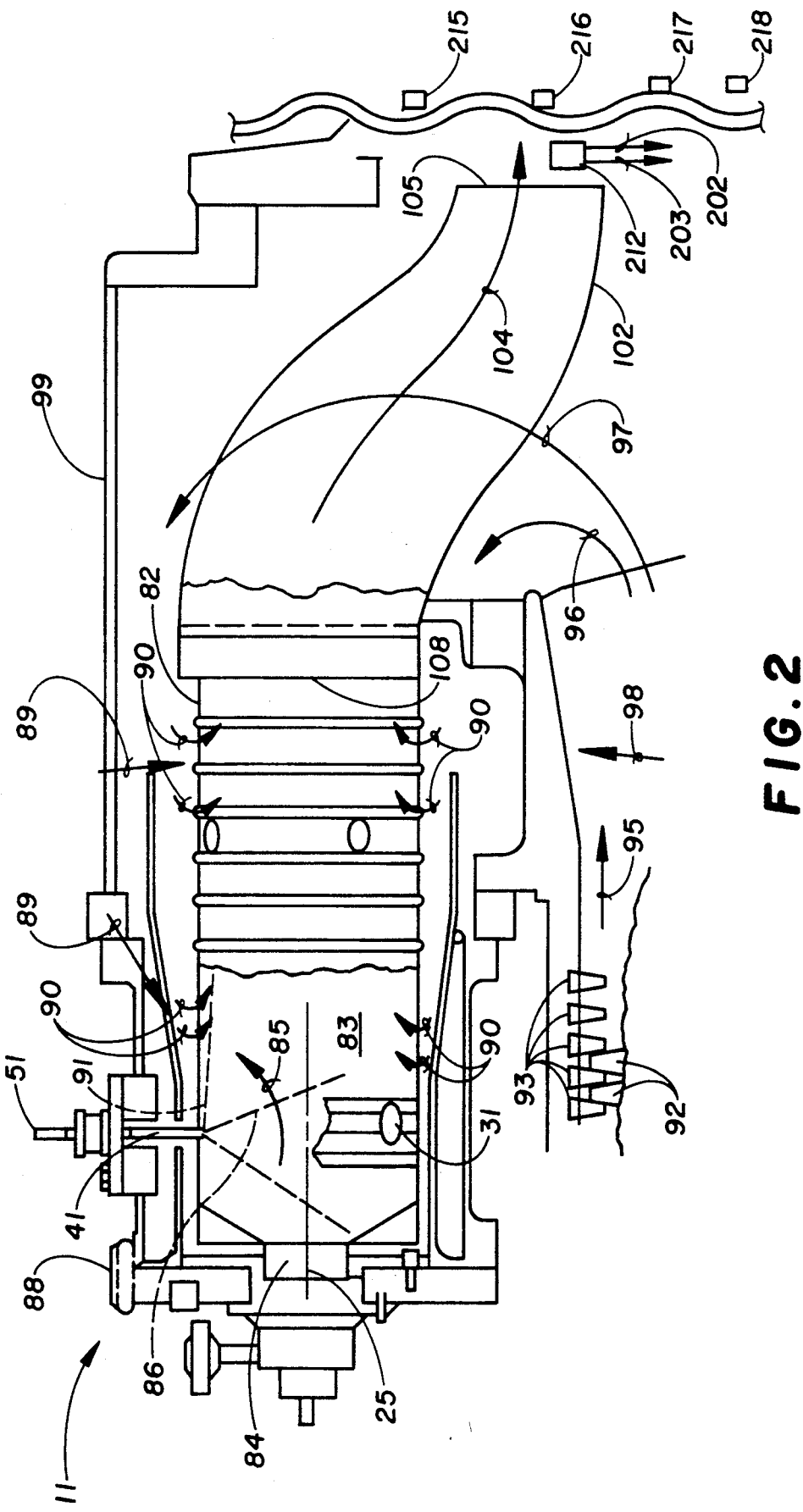
FIG. 2 is a diagram with portions cut away of a combustor.

Referring to FIG. 1, a flame diagnostic monitor 10 is shown for monitoring ten combustors 11 through 20 of a gas turbine having a rotor 24 and a longitudinal axis 25 of the rotor 24. Rotor 24 may rotate in a counter-clockwise direction as shown by arrow 26. Within each combustor 11–20 which is shown in more detail in FIG. 2 are air inlets and fuel nozzle 84 for introducing fuel into combustor 11. Further, an igniter is placed in two or more of the ten combustors. Each combustor 11–20 is connected to its adjacent side combustors by cross fire tubes 31–40 which are merely ducts to allow gases and flames from one combustor to enter into its adjacent side combustor to provide ignition or to equalize pressure between combustors.

Each combustor 11–20 has a flame monitor probe 41–50 having a wide angle field of view at the distal end for receiving flame images from each combustor. Each flame monitor probe has a lens and a flexible optical fiber capable of transmitting flame intensity patterns over distances of tens of meters. The flexible image guide may contain a bundle of loose fibers or a single multifiber image guide. Flame images from each combustor 11–20 are carried to a video camera 63 from combustors 11–20 over image guides 51–60 to lens 62 of video camera 63. Image guides 51–60 are combined together at the proximal end 64. Lens 62 may function as a magnifying lens and may be remotely controlled to focus the ten images at guide end 64 to video camera 63. Lens 62 may magnify the ten images at guide end 64 by factors of 5 to 50 times. Arrow 65 shows radiant energy passing between guide end 64 and lens 62.

The flame images from image guides 51–60 may be reflected totally or a portion thereof by mirror 160 which may be positioned between end 64 and lens 62 by actuator 161 which may be, for example, a motor. Radiant energy reflected by mirror 160 towards lens 162 is shown by arrow 163. Lense 162 functions to focus the radiant energy onto spectrometer 164. Spectrometer or monochromator 164 functions to provide color analysis of the flame images. The color spectrum of the flame images may be related to flame temperature through a computational analysis. The output of spectrometer 164 is coupled over lead 165 to an input of video analyzer 77 and an input of turbine controller 79. Spectrometer 164 along with video analyzer 77 provides a means for estimating the thermal energy output from a respective combustor 11–20. Spectrometer 164 further provides a means for estimating the mean temperature and thermal energy output from a combustor in conjunction with data processing performed in video analyzer 77 or turbine controller 79.

The output of video camera 63 is coupled over lead 66 to an input of video monitor 74 having a display screen 75. Lead 66 is also coupled to an input of video analyzer o recorder 77 which functions to digitize the flame patterns from each combustor 11–20 and to compare one to another and to predetermined flame patterns stored in the video analyzer 77.

Video analyzer 77 also has diagnostic logic to provide outputs over lead 78 to an input of turbine controller 79 and annunciator 80. Turbine controller 79 may adjust the flow rate of fuel 167 to combustors 11–20 individually or as a group. The annunciator 80 would warn station operators of an impending problem. Turbine controller 79 may have timing circuitry therein to monitor the time between the start of flow of fuel to a particular combustor and the time to which ignition is fully developed within the combustor and logic circuitry to shut down the fuel supply to one or all combustors should proper ignition not occur.

As shown in FIG. 1, fuel 167 is supplied to pump 168 which may function to provide fuel 167 at a predetermined pressure to valves 169 which may in fact consist of 1–10 valves one for each respective combustor. Valves 169 are controlled by the output of turbine controller 79 over leads 171–180 to control inputs of valves 169 to control individual valves 1–10. The fuel output of valves 169 pass through meters 181 which may, for example, consist of meters 1–10, one corresponding to each valve 1–10 for each combustor 11–20. Meters 181 function to measure the flow rate of fuel prior to passing over ducts 182 through 191 corresponding to combustors 11–20. The measurement of fuel flow rate from meters 181 are coupled to inputs of turbine controller 79 over leads 192–201. Turbine controller 79 functions to control fuel valves 169 to control the fuel to combustors 11–20. The actual fuel delivered over ducts 182–191 are measured by fuel meters 181 wherein the measurements are passed to turbine controller 79 over leads 192–201. The temperature of the exhaust gas of each combustor may be coupled over leads 202–211 to an input of turbine controller 79. The measurement of temperature may be obtained by a thermal couple shown in FIG. 2 placed in the proximity of the exit gas of the combustor shown by thermal couple 212 and leads 202 and 203. Alternatively, the temperature may be estimated or based on the measurements by spectrometer 164 or by thermal couples 215–218 placed around the annulus of the gas turbine exhaust as shown in FIG. 2.

Turbine controller 79 may control or balance or adjust the fuel delivered to respective combustors in response to the flame images in conjunction with turbine exhaust temperature to balance each combustor with respect to the others. In addition to adjusting fuel, the air flow, water injection flow rate may be adjusted using appropriate valves and meters.

FIG. 2 is a diagram of combustor 11 with portions cut away for better clarity. As shown in FIG. 2, flame monitor probe 41 extends to combustor liner 82 to view into the combustion region 83 which is downstream of fuel nozzle 84. Cross fire tube 31 is shown which connects with combustor 12. Flame monitor probe 41 may have a field of view for example 120 degrees as shown by arrow 85 and reference lines 87 and 91. The center of the field of view may be oriented along the probe optical axis or forward or downstream 25 degrees as shown by reference line 86. Combustor 11 also has a combustor cover 88 and cooling slots 89 to provide air shown by arrows 90 to combustor 11 through combustor liner 82. A compressor 94 having blades 92 and vanes 93 compresses air which then flows in a direction shown by arrows 95 through 97 into combustor 11 and into the combustion region 83 shown by arrows 90. A portion of a compressor discharge casing 98 is shown. The air from compressor 94 is guided by combustion wrapper 99. The exhaust gases from combustor 11 flow through duct 102 as shown by arrow 104. End 105 of duct 102 is positioned to guide the exhaust gases shown by arrow 104 onto the first row turbine blades supported by rotor 24. A portion of turbine shell 106 is shown. Flame monitor probe 41 functions to provide a visual image in the combustion region 83 of combustor 11.

FIG. 3 is a view of the flame 120 in an adjacent combustor such as combustor 12 as viewed by flame monitor probe 41 through cross-fire tube 31. In FIG. 3 the ordinate represents distance in the field of view along the combustor axis 25 and the abscissa represents distance in the field of view across the combustor axis 25 which is 90 degrees to the ordinate.

FIG. 4 is a view of fuel ignition 122 in combustion region 83 in combustor 11 as may be viewed by flame monitor probe 41. In FIG. 4 the ordinate represents distance along the combustor axis 25 in the field of view and the abscissa represents distance across combustor axis 25 in the field of view which is 90 degrees to the ordinate. Also shown in FIG. 4 is a view of the flame 120 in combustor 12 through crossfire tube 31. In FIG. 4 a delay of 73.2 seconds was observed for ignition to occur in combustor 11 after ignition had occurred in combustor 12.

FIGS. 5-8 are graphs of flame (as measured by a photodetector) versus axial distance along combustor axis 25 in combustor 11 with different turbine loadings or torque. A photodetector is a device for converting photons into electrons. The measure of electrical current generated by a photodetector gives a relative indication of the amount of electromagnetic light energy absorbed by the photodetector. Consequently, in FIGS. 5-8 the ordinate is a measure in amperes of electrical current from the photodetector, which is illustrated to give a represents flame intensity. The abscissa represents axial distance starting a few cm in front of the fuel nozzle 84 and ending at combustor end or exit 108 shown in FIG. 2. FIG. 5 shows curve 124 of the flame intensity extending from in front of the fuel nozzle 84 to a predetermined distance about 0.44 of the distance to the end or exit 108. In FIG. 5, curve 124 was recorded with a 0 megawatt power loading on the turbine.

FIG. 6 shows curve 125 with 13 megawatts power loading on the turbine. As shown in FIG. 6 the intensity close to the fuel nozzle 84 has decreased and curve 125 extends 0.67 of the distance between the fuel nozzle 84 and exit 108.

FIG. 7 shows curve 126 of the flame intensity with 38 megawatts power loading on the turbine. The flame intensity has moved away from fuel nozzle 84 and begins at 0.22 of the distance towards exit 108 and extends to 0.86 of the distance towards exit 108.

Curve 127 shows the flame intensity between fuel nozzle 84 and exit 108 with a loading of 56 megawatts on the turbine. The flame intensity has moved further away from fuel nozzle 84 to about 0.31 of the distance towards exit 108 and extends to the combustor exit 108.

As can been seen by curves 124-127 in FIGS. 5-8, as the power loading on the turbine increased from 0 to 56 megawatts, the flame intensity separates and moves away from fuel nozzle 84 and the shape of the flame intensity curve appeared to spread out longitudinally as it moved away from fuel nozzle 84.

FIG. 9 is a view of flame monitor probe 41. Flame monitor probe 41 may have, for example, 2000 resolution elements as compared to 80,000 resolution elements used in a prior flame monitor probe. A flame monitor probe with 2,000 resolution elements appears to have sufficient resolution for providing flame monitoring data to video analyzer 77. The flame monitoring probe functions to provide images to enable good quality flame contours or profiles to be obtained by the video analyzer 77 which also computes flame pattern recognition features such as the centroid, second order moment, extension, width, asymmetry, radius of gyration, and relative intensity at specified coordinates. The diameter of flame monitor probe shown by arrows 131 is ten millimeters. An image guide 51 with a diameter of 0.3 mm may leave flame monitor probe 41 through flexible metal cable 132.

FIG. 10 is an enlarged view of distal end 135 of flame monitor probe 41. FIG. 11 is an enlarged view of a portion of FIG. 10. Distal end 135 may have a housing 136 to provide mechanical support to the components held within flame monitor probe 41. Housing 136 may be made of stainless steel type 321. Housing 136 may have a cylindrical cavity 137 having a first diameter shown by arrow 138 joining a second cylindrical cavity 139 having a second diameter shown by arrow 140. The diameter of cavity 139 is less than the diameter of cavity 137 thereby forming an annular ledge 141 where they join together. Cylindrical cavities 137 and 139 have a common longitudinal axis shown by reference line 142. Fixture 143 may be cylindrical in shape having a first diameter slightly less than cylindrical cavity 137 joining a cylindrical portion having a second diameter slightly less than cylindrical cavity 139 which are joined together to thereby form an annular ledge 144 which may seat against annular ledge 141 to position fixture 143 with respect to the end of housing 136. A gasket or sealing material 155 may be positioned between annular ledges 141 and 144 to provide a barrier to combustion gases.

Fixture 143 has a cylindrical cavity 145 having an opening which may be circular and of a diameter slightly less than the diameter of the cavity to provide a lip 146 around opening 147. The diameter of cavity 145 is sufficient to receive ball lense 148 which may be positioned at opening 147 but prevented from leaving cavity 145 by lip 146. The ball lens may have diameters typically as small as 0.3 mm. An image guide 150 may be inserted into cavity 145 against ball lens 148 to receive an optical image received by ball lense 148 at opening 147. Ball lense 148 may be, for example, sapphire or zirconia material that will withstand the harsh environment of a combustor and form images required for transmission over image guide 150.

The external surface of ball lens 148 at opening 147 is exposed, as the furthest point of the probe for example, to inlet gas flow from the compressor of the turbine by way of the air inlet so as to keep the ball lens 148 and its surface free from the accumulation of dust and dirt. Ball lens 148 provides a wide angle telecentric lens and may be held in place by pressure from image guide 150 that spring loads the ball lens onto or against lip 146 to prevent looseness during thermal cycling. Image guide 150 is held in place in fixture 143 and against ball lens 148 by cement 152 which may be, for example, ceramic cement. Ceramic cement 152 may also function to provide a barrier to combustion gases. A small spherical indentation that has the same radius as the ball lens may be polished into the end surface of the image guide to spread the contact force between the ball lens and image guide over a larger area and eliminate the possibility of stress cracking and help improve imaging characteristics of the ball lens. A cavity 153 which may be larger than cavity 145 inside fixture 143 and joining cavity 145 provides space for inserting cement between image guide 150 and fixture 143. Fixture 143 may be held against annular ledge 141 by means of an inner sleeve 154 which may be inserted into cavity 137 and pressed against fixture 143 to compress and hold fixture 143 and its annular ledge 144 against annular ledge 141 of housing 136. Fixture 143, inner sleeve 154 may be of stainless steel material to withstand the high temperatures. The limiting temperature of flame monitor probe 41 is the temperature at which the glass of the image guide 150 softens.

What is claimed is:

1. A method for detecting the malfunction of a gas turbine during ignition, start up and under torque load comprising the steps of: optically viewing the entire flame in each combustor of said gas turbine, determining a flame pattern based on electromagnetic radiation from the flame as a function of position in the field of view in each combustor, and
  comparing the flame pattern of each combustor with a plurality of predetermined flame patterns, and determining a diagnosis of malfunction associated with one or more combustors of said turbine by the individual and total combustor correlated with the predetermined flame patterns.

2. The method of claim 1 further including the steps of combining individual flame patterns of two or more combustors to form a composite flame pattern, and determining a diagnosis of malfunction associated with one or more combustors of said turbine by the composite flame pattern correlated with said predetermined flame patterns.

3. A method for detecting the malfunction of a gas turbine during ignition, start-up and under torque load comprising the steps of:

optically viewing the entire flame in two or more combustors of said gas turbine,
  determining a flame pattern based on electromagnetic radiation rom the flame as a function of position in the field of view in each said combustor, and
  combining individual flame patterns of two or more combustors to form a composite flame pattern,
  comparing said composite flame pattern with a predetermined plurality of flame patterns, and determining a diagnosis of malfunction associated with one or more combustors of said turbine by the individual composite flame pattern correlated with said predetermined flame patterns.

* * * * *